June 29, 1948.  O. L. ALLEN ET AL  2,444,324
CONTROL FOR MOTOR BOATS AND THE LIKE
Filed Dec. 31, 1940  10 Sheets-Sheet 1
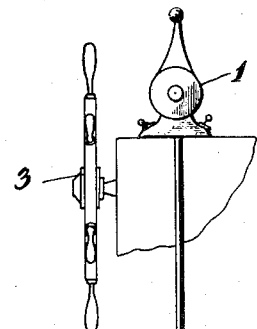
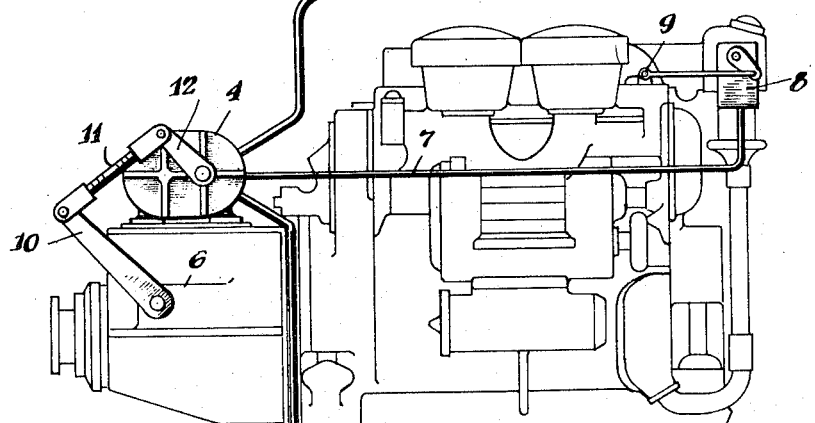
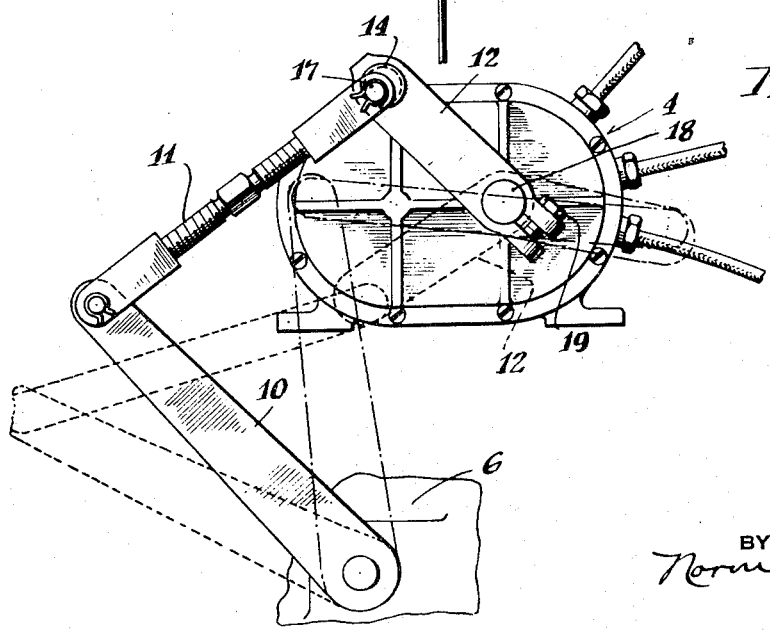
INVENTORS
Oliver L. Allen
BY Earle T. Allen
Norman L. Holland
ATTORNEY

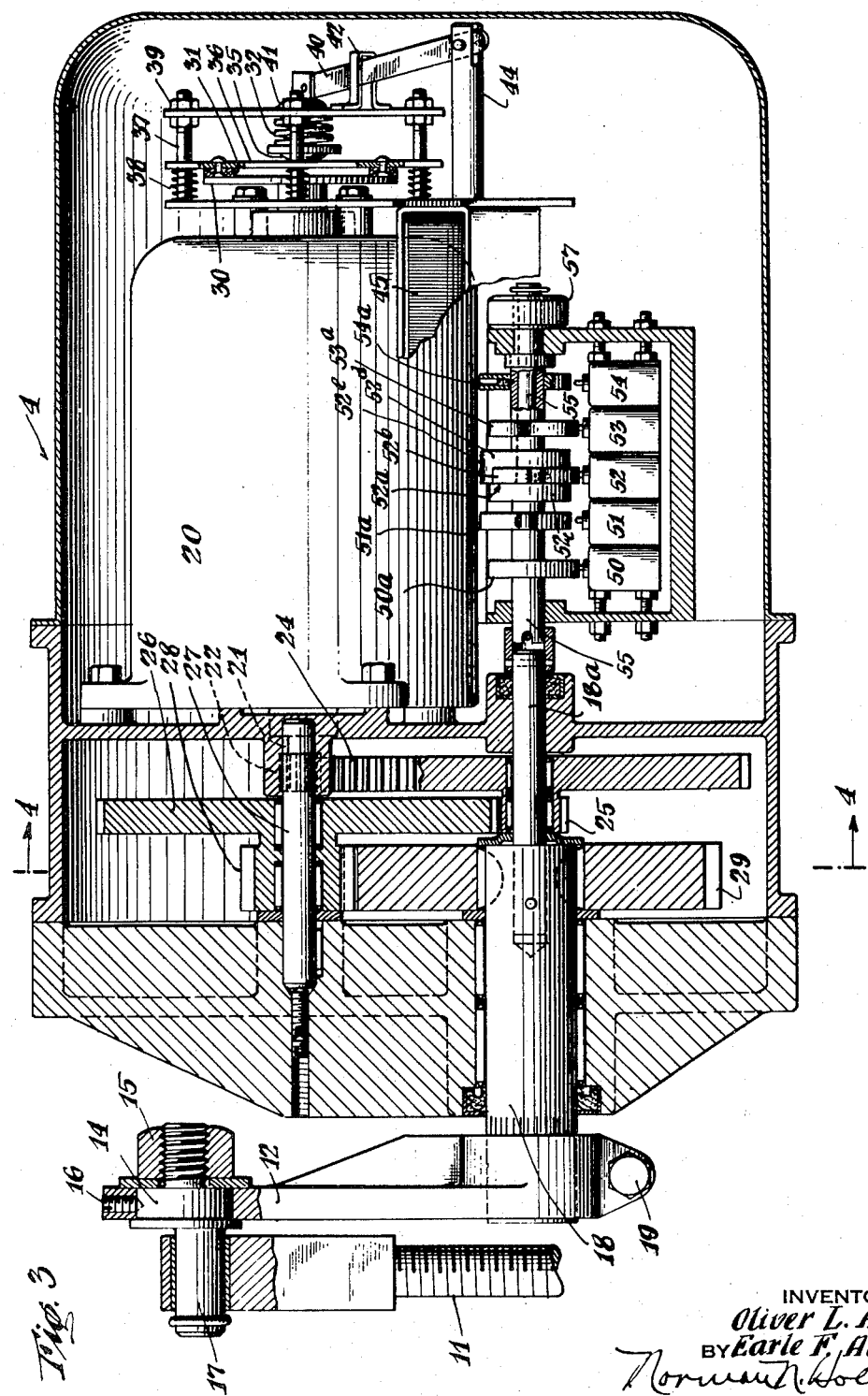

June 29, 1948.  O. L. ALLEN ET AL  2,444,324
CONTROL FOR MOTOR BOATS AND THE LIKE
Filed Dec. 31, 1940  10 Sheets-Sheet 3
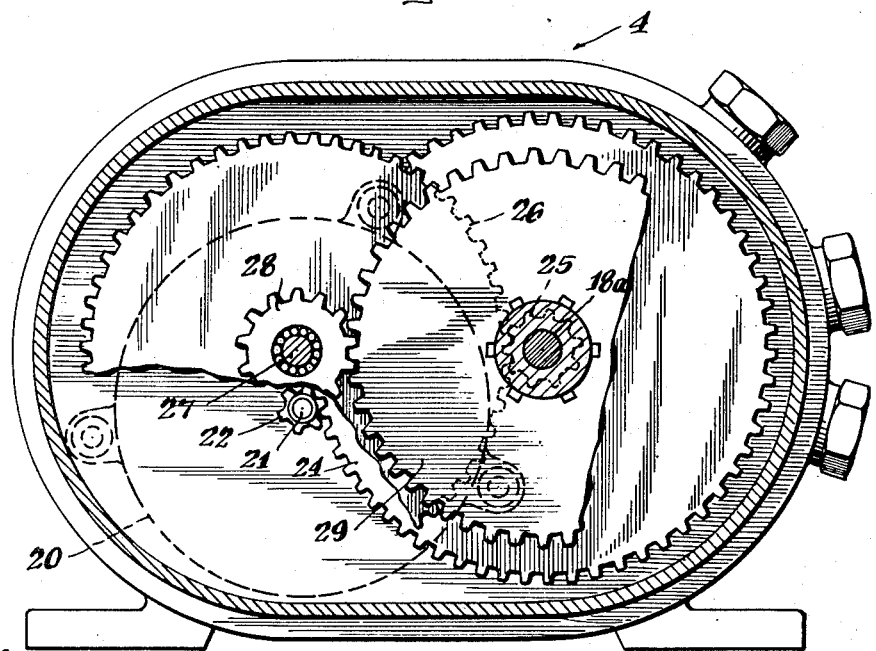
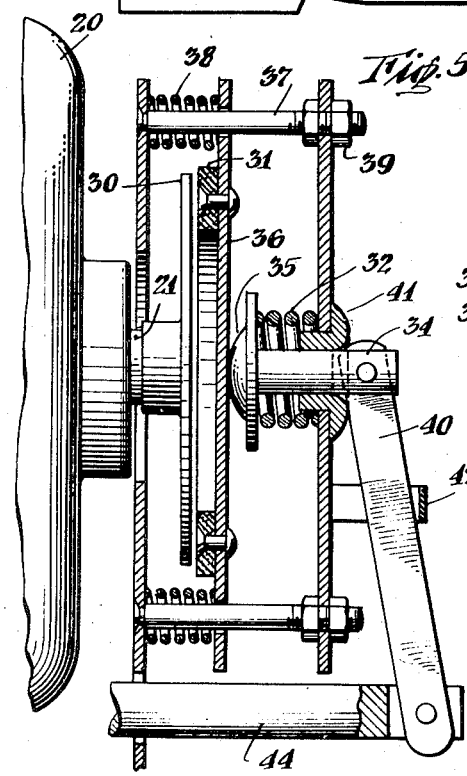
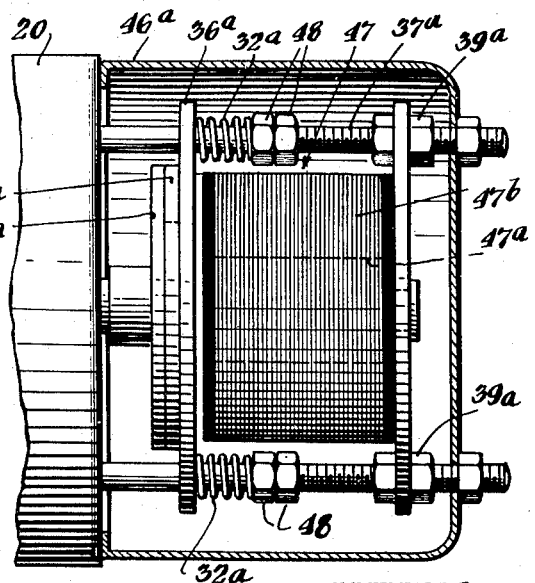
INVENTORS
Oliver L. Allen
BY Earle F. Allen
ATTORNEY June 29, 1948.　　O. L. ALLEN ET AL　　2,444,324
CONTROL FOR MOTOR BOATS AND THE LIKE
Filed Dec. 31, 1940　　10 Sheets-Sheet 4
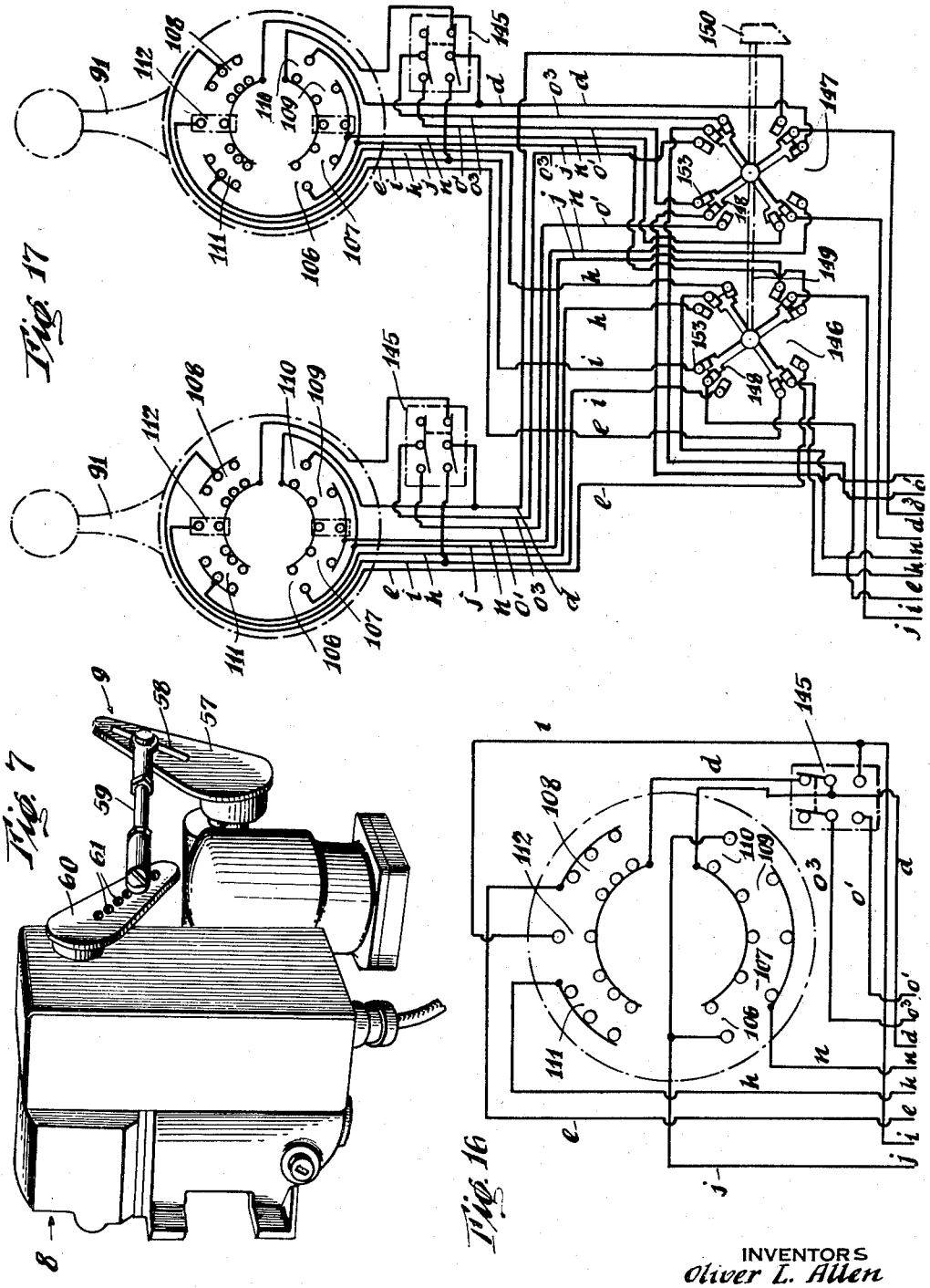
INVENTORS
Oliver L. Allen
BY Earle F. Allen
Norman J. Holland
ATTORNEY June 29, 1948.　　　O. L. ALLEN ET AL　　　2,444,324
CONTROL FOR MOTOR BOATS AND THE LIKE
Filed Dec. 31, 1940　　　　　　　　　10 Sheets-Sheet 5
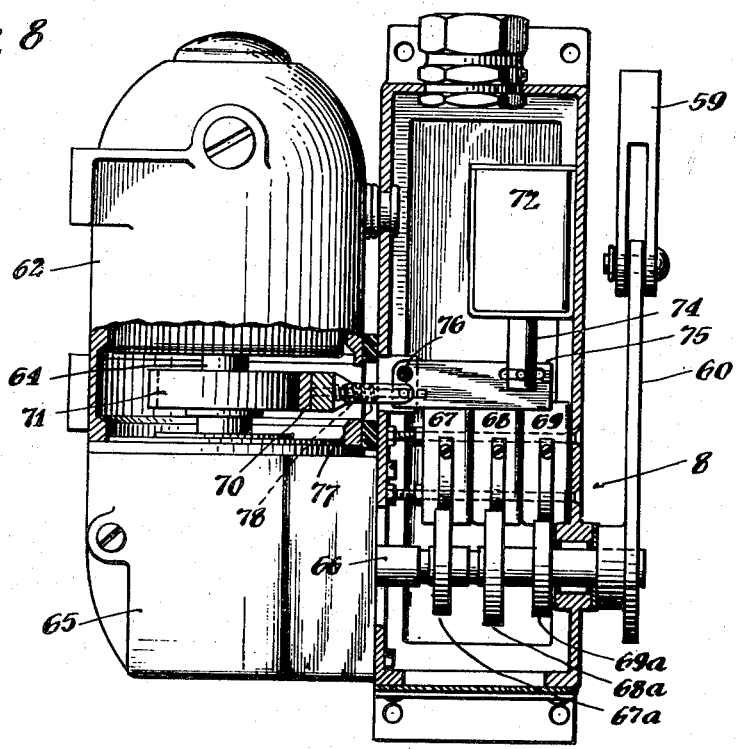
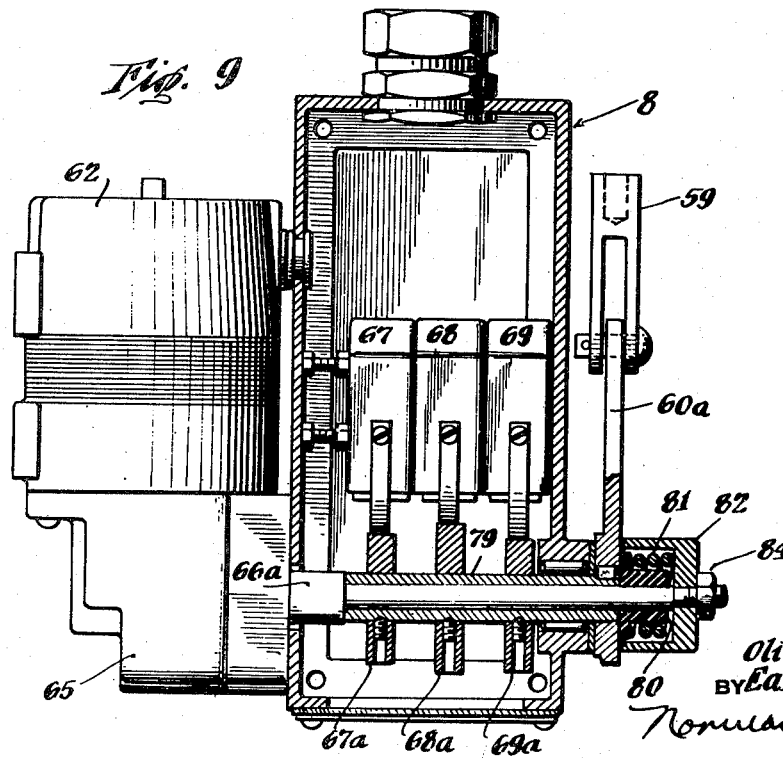
INVENTORS
Oliver L. Allen
BY Earle F. Allen
ATTORNEY

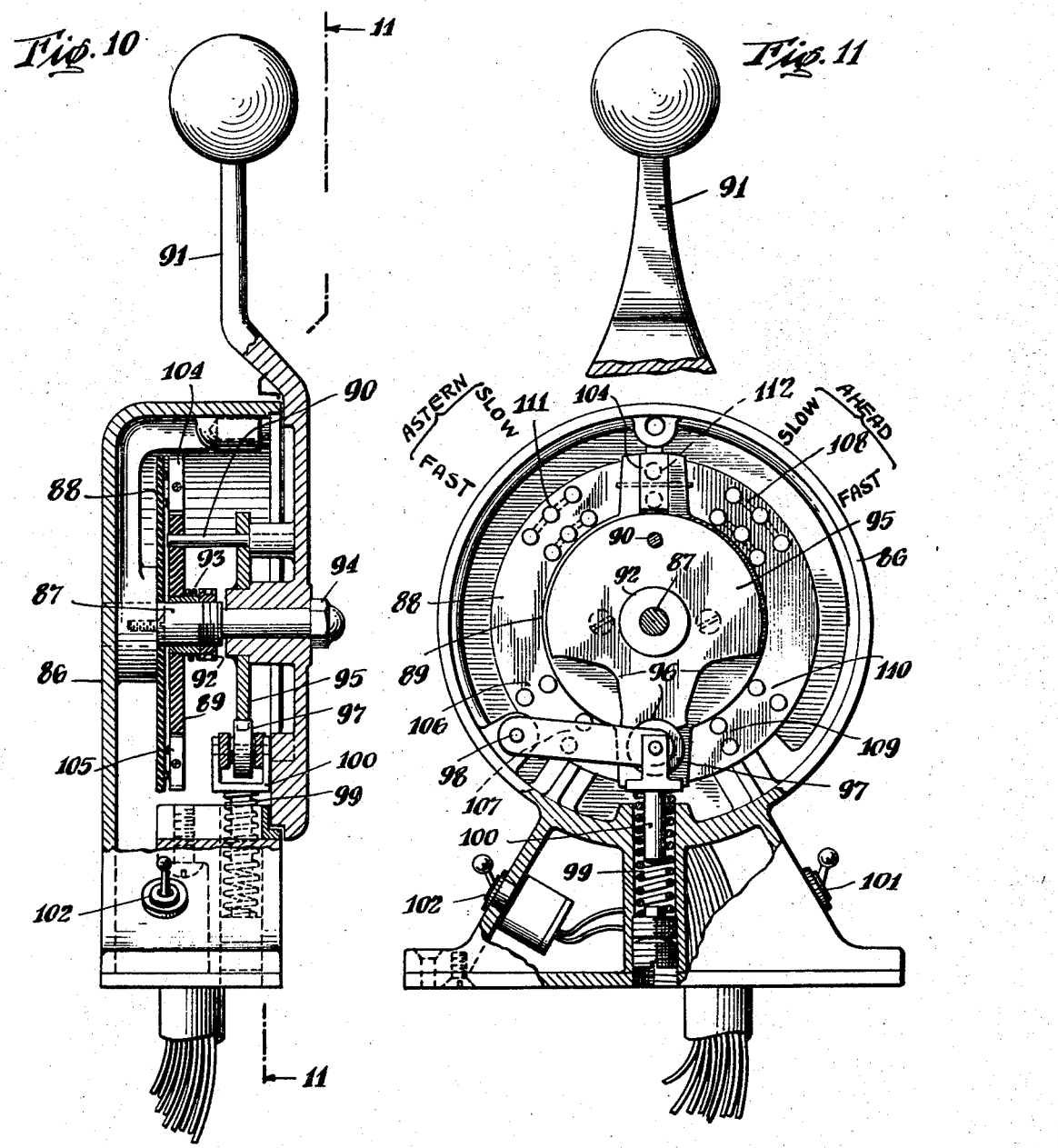

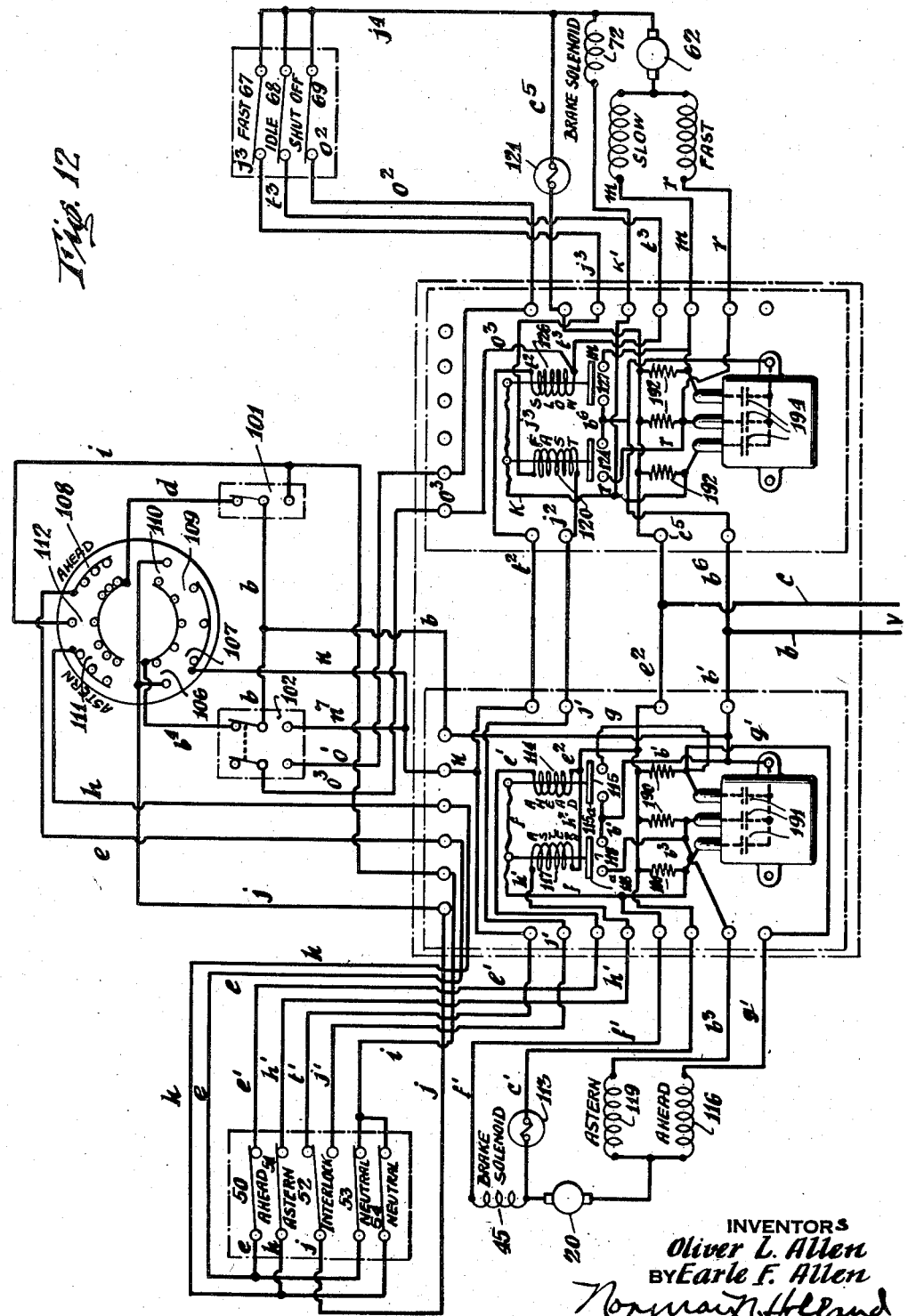

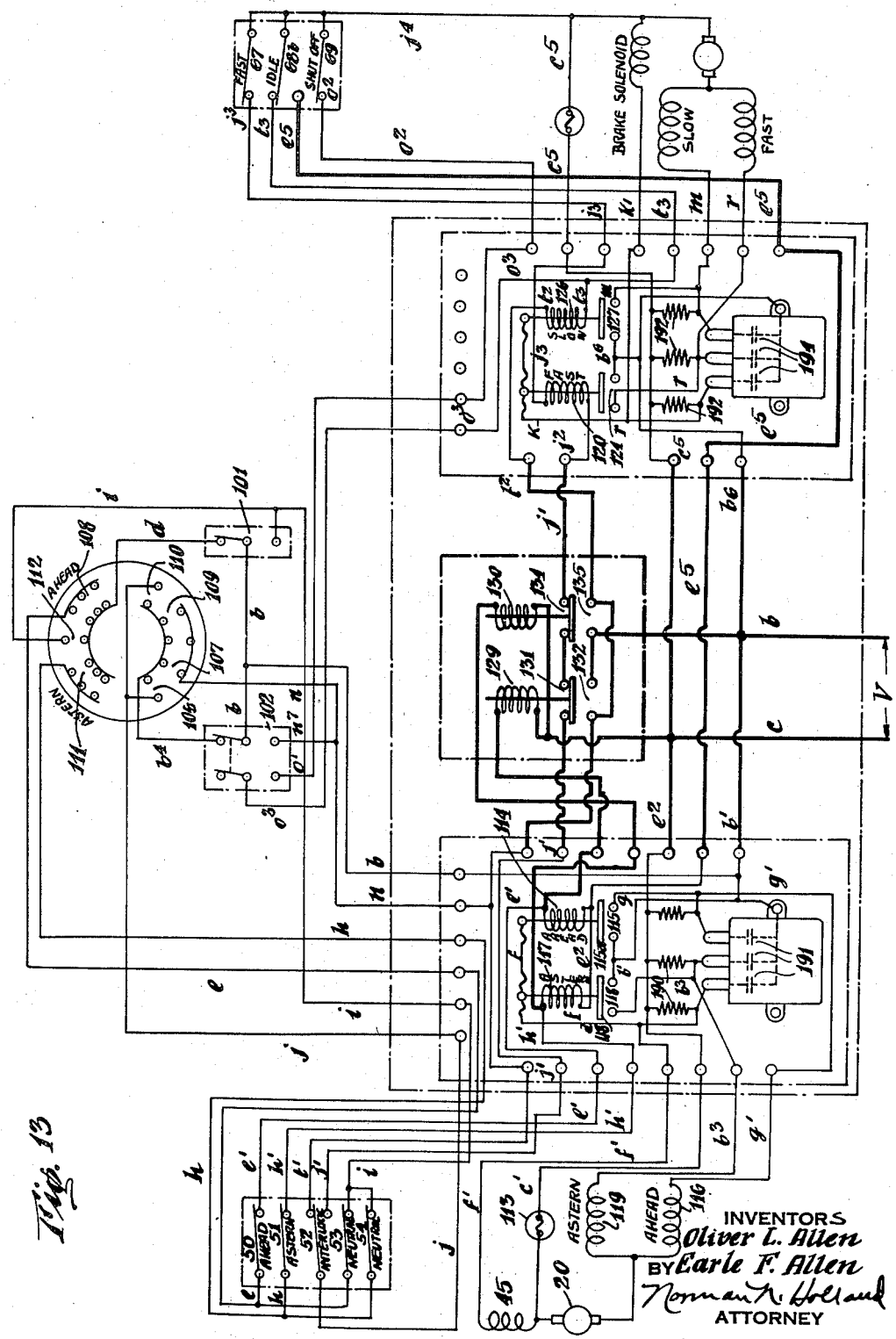

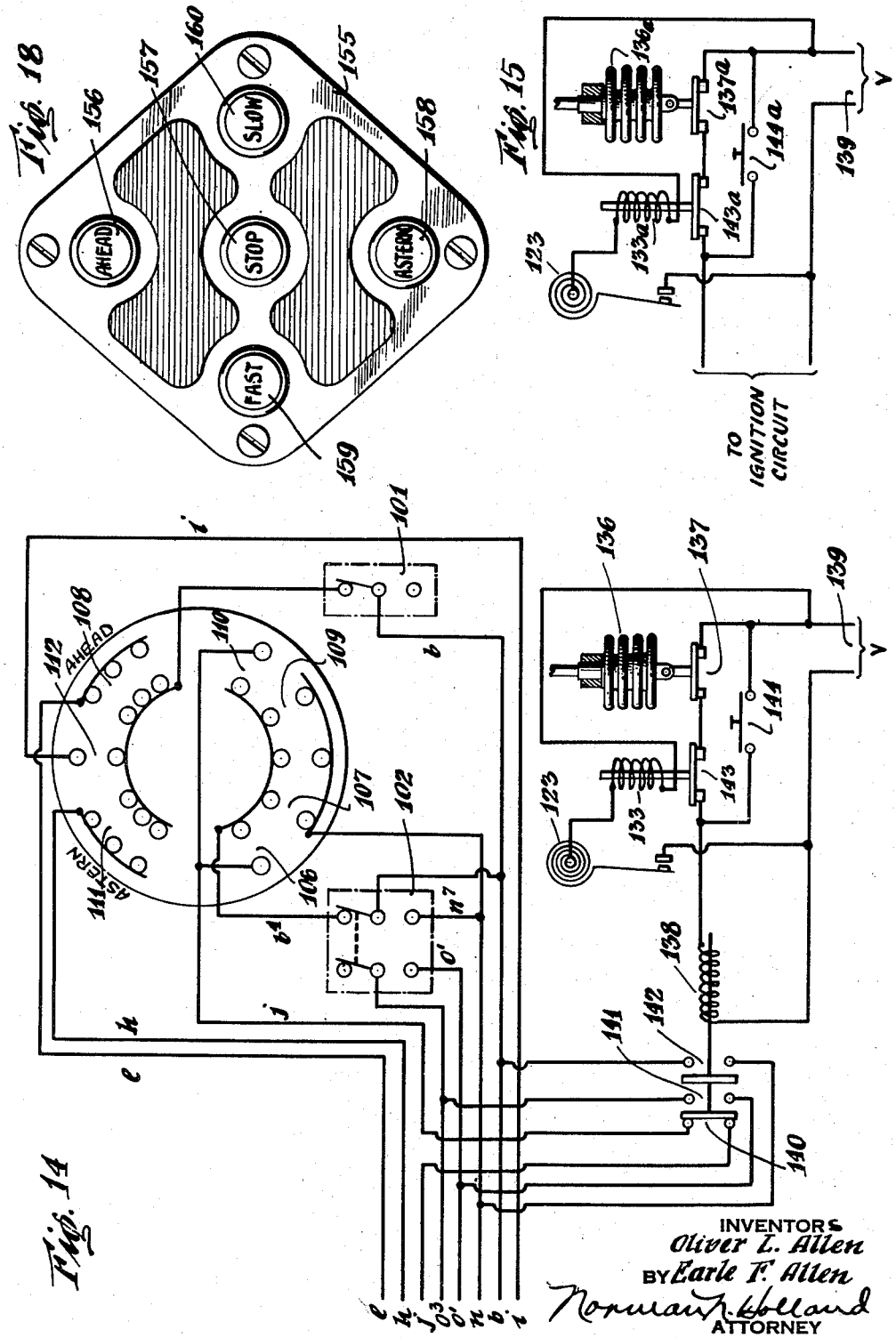

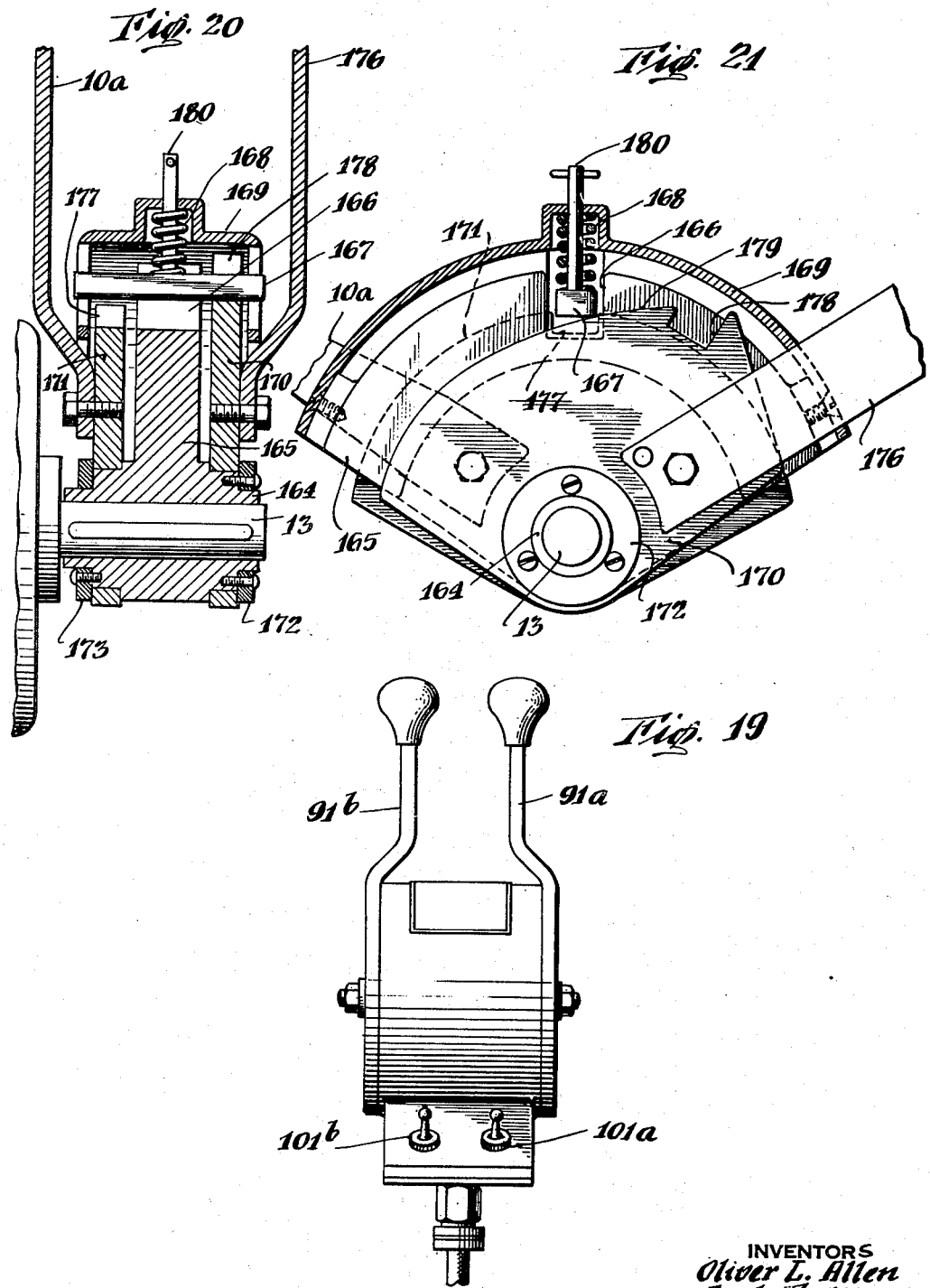

Patented June 29, 1948

2,444,324

UNITED STATES PATENT OFFICE 2,444,324

CONTROL FOR MOTORBOATS AND THE LIKE

Oliver L. Allen, Pleasantville, and Earle F. Allen, Briar Cliff Manor, N. Y., assignors, by mesne assignments, to Erwin J. Panish, doing business as Panish Controls, Bridgeport, Conn.

Application December 31, 1940, Serial No. 372,450

27 Claims. (Cl. 192—.01)

The present invention relates generally to controls and more particularly to controls for motor boats and the like.

In the operation of motor boats, it is necessary that the operator be on the bridge or at some other position where he can observe the approach of other boats and obstacles and can maneuver the boat in close places. The engine on the other hand is usually some distance away from the bridge and out of reach of the operator. This is particularly true in larger boats and applies both to the clutch for stopping the boat and for moving it astern and also to the throttle for controlling the speed of the boat. In large boats telephones, speaking tubes or engine room telegraphs are frequently utilized for instructing a person at the engine. In the operation of the clutch and throttle, certain types of automatic devices are utilized for operating the engine from the bridge but none of them is satisfactory for the unusual requirements. The requirements are frequently very exacting, for example when tying up at a wharf, when placing a boat at a boat house or otherwise maneuvering in close quarters. Further, in shifting the clutch the propeller is disconnected from the engine, which removes the load from the engine. Hence the engine speeds up if the throttle is open and such increase in the speed may be sufficient with certain types of engines to damage the engine by throwing a fly wheel or a piston rod. Another difficulty is that of holding the clutch in neutral position. If the clutch moves too far in one direction, it will engage the ahead gear and move the boat ahead, and, if it moves too far in the other direction, it will engage the astern gear and move the boat astern.

The present invention aims to provide a control for operating a boat from the bridge, or from any other suitable location giving a view of the surrounding water, with the same degree of flexibility as one may operate it directly at the engine, and without the dangers of the clutch being thrown while the engine is operating at excessive speeds. The invention provides means for automatically slowing down the engine before the clutch is shifted. Automatic means are also provided adapted to stop the clutch in substantially its exact neutral position, and, if it drifts beyond such position in either direction, to bring it back to its proper position automatically. The above and other advantages are achieved with a simple and effective mechanism which permits the pilot to manipulate a boat from the bridge without being inconvenienced by being at a position remote from the engine.

An object of the present invention is to provide an improved, simple and effective device for operating the clutch and throttle of an engine from the bridge or other suitable location on a boat.

Another object of the invention is to provide a simple and effective means for operating the clutch of an engine and thereafter for increasing and decreasing the speed of the engine.

Another object of the invention is to prevent the engine from being disconnected from the propeller shaft until the engine reaches a safe operating speed for such disconnection.

Another object of the invention is to provide auxiliary means for controlling the speed of the engine by the clutch operating means without disturbing the position of the clutch.

Another object of the invention is to prevent the operation of the engine at high speeds if the temperature is excessive or if the oil pressure is inadequate.

Another object of the invention is automatically to decrease the speed of the engine before the clutch is shifted when the control is moved from full speed ahead to full speed astern and vice versa.

Another object of the invention is accurately to shift the clutch into neutral and to automatically bring the clutch back to neutral if it goes beyond its neutral position.

Another object of the invention is to provide limit switches which prevent the operation of the controls except under predetermined conditions.

A further object of the invention is to provide means for warming the engine up from the bridge with the clutch controls ineffective.

A still further object is to operate the clutch with a minimum amount of power at the time of the greatest pressure required for engaging and disengaging the clutch.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein Fig. 1 is a diagrammatic view illustrating the controls applied to a marine engine, the engine being shown in light lines;

Fig. 2 is an end elevational view illustrating the operation of the clutch through the intermediation of the toggle, the full line position of the toggle illustrating the clutch in neutral position and the dotted line positions illustrating it in forward and astern positions;

Fig. 3 is a sectional view through the clutch operating mechanism shown in Fig. 2 illustrating the parts thereof;

Fig. 4 is a sectional view along the lines 4—4 of Fig. 3 illustrating the motor drive;

Fig. 5 is a detailed sectional view of an automatic brake for stopping the motor when the clutch is in its desired position;

Fig. 6 is a detailed sectional view of another form of the brake shown in Fig. 5 for stopping the clutch operating motor;

Fig. 7 is a perspective view of the mechanism for operating the engine throttle;

Fig. 8 is a sectional view of one embodiment of the throttle operating mechanism;

Fig. 9 is a sectional view of another embodiment of the throttle operating mechanism;

Fig. 10 is a sectional view through the pedestal illustrating the construction thereof;

Fig. 11 is a sectional view along the line 11—11 of Fig. 10 illustrating the shape of the cam for holding the parts in proper position and also illustrating the contacts for the electrical circuits controlled by the pedestal;

Fig. 12 is a wiring diagram of the clutch and throttle controls applied to an engine for the operation thereof;

Fig. 13 is a wiring diagram similar to the one shown in Fig. 12 with the addition of automatic means for slowing the engine to idling speed before operation of the clutch and for permitting the controls to be moved from full speed ahead to full speed astern without strain on the clutch or on the engine;

Fig. 14 is a wiring diagram for the addition of automatic means for stopping the engine if the oil pressure is too low or if the temperature is too high.

Fig. 15 is a wiring diagram similar to Fig. 14 for opening the ignition circuit if the temperature is too high or if the pressure is too low;

Fig. 16 is a wiring diagram for a pedestal particularly adapted for use with a gasoline engine;

Fig. 17 is a wiring diagram for the equipment of a boat with a plurality of pedestals located at different positions;

Fig. 18 is a top plan view of a push button combination for operating the controls;

Fig. 19 is a perspective view of a pedestal for operating a boat with a plurality of engines;

Fig. 20 is a sectional view illustrating a device for permitting the clutch to be hand operated as well as automatically operated; and Fig. 21 is a side elevational view with parts broken away of the mechanism shown in Fig. 20.

Described generally and referring more particularly to Fig. 1 of the drawings, a pedestal 1 for controlling both the clutch and the throttle of the engine is mounted on the bridge of the boat adjacent the steering wheel 3, and is connected by an electrical cable 2 to the mechanism 4 for operating the clutch 6 of the engine. A second electric cable 7 connects with a mechanism 8 for operating the throttle 9 to control the speed of the engine. The electrical cable 7 as well as the electrical cable 2 connect with the pedestal 1 and hence the clutch of the engine may be operated and the speed of the engine may be changed from the pedestal. There are a number of features in connection with the clutch control and in connection with the throttle control which will be described hereinafter. There are also automatic and safety features to prevent the clutch from being thrown while the engine is operating at an excessive speed. Diesel engines have requirements which differ from those of gasoline engines. The present invention is adapted to control either type of engine.

For convenience in describing the preferred embodiment, the parts will be explained in the following order: (1) a clutch operating mechanism, (2) a throttle operating mechanism, (3) a pedestal, (4) a wiring diagram for a Diesel engine, (5) another wiring diagram for a Diesel engine, (6) a wiring diagram for two pedestals, and (7) a wiring diagram for slowing down the engine when the oil pressure becomes inadequate or the temperature becomes too high.

Clutch operating mechanism

The clutch operating mechanism, apart from the electrical connections therein, is shown more particularly in Figs. 2 to 6. Referring more particularly to Fig. 2, the engine clutch 6 has an operating arm or lever 10 with an adjustable link 11 secured at one end to the lever 10 and at its other end to a lever 12 operated by the power operating means 4 for the clutch. The link 11 preferably comprises a pair of end sleeves threaded to a central part so that the length thereof may be increased or decreased to obtain an accurate adjustment between the parts of the clutch and the parts of the clutch operating mechanism. This is particularly desirable in order to obtain accurate movement of the clutch into its three positions. A further adjustment is provided by means of an eccentric connection 14 between the end of the lever 12 and the adjustable link 11. By loosening the nut 15 and the set screw 16, the eccentric pin 17 may be moved around as shown more particularly in Fig. 3 to make minor adjustments in the parts. The arm 12 is clamped about the serrated end of a shaft 18 by means of the bolt 19. The clutch operating means 4 operates the clutch 6 through a toggle formed by the members 10, 11 and 12 by the rotation of shaft 18. The mechanism for rotating shaft 18 is shown more particularly in Figs. 3 and 4. An electric motor 20 rotates the shaft 18 through the intermediation of motor shaft 21, gear 22 thereon, intermeshing gear 24 rotatably mounted on shaft 18a and integral with gear 25, intermeshing gear 26 rotatably mounted on shaft 27 and integral with gear 28, gear 28 and intermeshing gear 29 keyed to shaft 18. Any suitable reduction gear may be utilized to permit a high speed low torque motor to operate the clutch but spur gears are preferred to obtain ample speed reduction with maximum efficiency. In the larger engines, when the lubricating oil is cold, very substantial pressures are required to operate the clutch and hence as much leverage as possible is desired. The torque at the shaft 18 is much greater than the torque at the motor shaft by reason of the reduction gearing, which is further increased by the toggle joint. It will be noted (Fig. 2) that the shaft 18 and arm 12 thereon when rotated to the left straighten the toggle links 11 and 12. The adjustment of the link 11 is such that the clutch is engaged and disengaged as the toggle joint approaches its straight position, that is, when the leverage resulting therefrom is greatest. Hence the toggle joint decreases substantially the torque required at the shaft 18 at the period of maximum pressure required for operating the clutch. This permits the use of a smaller motor by decreasing the peak load thereon. A further feature is the fact that after closing the clutch the arm 12 moves beyond its dead center position so that the clutch is withdrawn slightly to relieve the pressure thereon. This prevents what is commonly known as "riding the clutch" and the excessive wear resulting therefrom. The same result is achieved when the shaft 18 and arm 12 are rotated to the right to throw the clutch in astern position. In that case the clutch closes as the arm 18 and the link 11 approach their dead center position, and the arm 12 continues to rotate, as the clutch is closed, past the dead center position to relieve the clutch of any pressure and to prevent "riding." Another feature of the toggle joint operating mechanism is that with the proper adjustment the failure of the motor to stop at the proper position does not damage any of the parts. That is, if by any chance the motor continues to rotate the shaft 18, the clutch will continue to shift through its several positions without damage to the parts.

It is desirable that the electric motor stop at substantially the desired position and that it be held in this position to prevent the clutch from coming out. For this purpose an automatic brake is provided and is shown more particularly in Figs. 3 and 5. The opposite end of the shaft 21 of the motor carries on it the brake disc 30. A brake band 31 is normally forced against this disc by means of a spring 32 extending about a member 34 having a ball member 35 engaging the center of a disc 36 on which the brake band 31 is mounted. The disc 36 has apertures in its periphery which fit over pins 37 to hold it in proper position. Springs 38 force it outwardly away from the disc 30 when the pressure applied by the spring 32 and the ball member 35 is relieved. It will be understood that the spring 32 is stronger than the combined springs 38. The amount of pressure applied by the spring 32 may be regulated by the adjustment nuts 39. The brake is released by means of a lever 40 pivotally connected to the end of the member 34 and fulcrumed on one side of a bushing 41. The member 42 at the center of the lever serves as a guide for the movement thereof. The opposite end of the lever 40 is pivotally connected to a member 44 operatively connected to the core of an electric magnet 45. When current is applied for starting the motor, it is also applied to the electric magnet 45. The magnet, through core 44, lever 40, fulcrum at 41, and member 34, relieves the pressure on the disc 36 which is forced outwardly by springs 38 to release the brake. Thus the brake operates normally to hold the shaft of the motor stationary except for those times when current is applied to the motor for shifting the clutch when the brake is automatically released by the magnet 45. This is a very effective means of securing accurate operating results and of locking the clutch in shifted position to prevent accidental operation thereof.

Another form of brake is shown in Fig. 6 of the drawings wherein a casing houses an electric magnet 47 with a core 47a and a wire coil 47b. The brake disc 30a on the motor shaft engages the brake band 31a secured to a disc 36a. Suitable springs 32a mounted on the threaded members 37a and held in position by adjustment nuts 49 resiliently retain the disc 36a in effective braking position. The position of the core 47a of the magnet is adjusted to give proper clearance between the plate 30a and 36a by means of adjustment nuts 39a. When current is applied to the motor, the core 47a of the magnet withdraws the disc 36a from its braking position in opposition to the springs 32a. In this manner the brake is normally in position to stop the motor and is released when the current is applied to the motor and simultaneously to the magnet. The magnet operates directly on the disc 36a without the intermediation of a leverage mechanism.

In addition to the brake the clutch operating mechanism carries a series of five electrical switches 50, 51, 52, 53 and 54 operated by cams 50a, 51a, 52a, 53a and 54a, respectively, on shaft 55 operatively connected to shaft 18a. These switches 50 to 54 are shown on the wiring diagram and their operation will be described in detail in connection therewith. At this point it may be helpful to point out that the switches 50 and 51 are for stopping the motor when the clutch is in ahead and astern positions, respectively. Switches 53 and 54 are for the neutral, and switch 52 for the interlock which will be described hereinafter. The cams 50a to and including 53a are all fixed to the shaft 55 by means of set screws. Preferably two set screws are used for each cam to be sure that the cams do not shift. The interlock cam 52a has three raised portions so that the switch 52 will be closed three times during a complete revolution of the cam. For convenience in adjustment the cam 52a is made of three separate cams, a central cam 52b, and two other cams 52c and 52d. In this manner all three of the switch operating portions may be adjusted with respect to each other. In other words the two outer cams have overhanging parts 52e which serve as raised portions on the middle cam. In order to adjust cams 52d, 53a, and 54a as a group with respect to cams 50a, 51a, 52c and 52b as a group, the former are mounted on a sleeve on the outer end of which the adjustment knob 57 is mounted. By releasing the set screw of knob 57 the three cams 52d, 53a and 54a may be adjusted as a group with respect to the other four. This facilitates control and adjustment of the neutral position of the clutch, as to which considerable accuracy is required.

In certain instances it is desirable to operate the clutch by hand. For this purpose there is shown in Figs. 20 and 21 a connection between the clutch operating lever 10a and the clutch shaft 13 which will permit hand operation. A hub 164 is keyed to the clutch shaft 13. Integral with the hub is a fragmentary part of a disc 165. In a suitable recess 166 in the disc a pawl 167 is mounted and held in its lower position by means of a spring 168 interposed between the pawl and casing 169 extending over the disc part 165. A pair of cams 170 and 171 are mounted on the hub and held in position thereon by members 172 and 173 free to rotate about the hub. One of the cams 171 has the clutch lever 10a attached thereto with its upper end attached to the power operated means for the clutch as shown in Fig. 2 of the drawings. The other cam 170 has a hand operated lever 176 attached thereto. If the cam 170 is operatively connected to the member 165 and the cam 171 is detached therefrom, the clutch may be hand operated. If on the other hand the cam 171 is attached to the member 165 and the cam 170 detached therefrom, the clutch may be automatically operated. The cam 171 may be attached to the clutch by means of the recess 177 therein. When the recess is in proper position the pawl 167 will snap therein. The cam 170 for hand operation may be interlocked with the pawl by moving it upwardly as shown in Fig. 21 until the recess 178 is engaged. In raising the hand operated cam upwardly, the cam surface 179 raises the pawl 167 and the recess 178 is sufficiently high to keep it out of engagement with the cam 171. Hence automatic operation of the cam 171 will have no effect. The pawl 167 may be disengaged from the hand operated cam 170 by manually raising the pin 180. When the pawl 167 is in the cam 171 for automatic operation, the hand lever 176 has to be moved down so that the cam surface 179 is out of the way. In this way the hub 164 and the integral part 165 may be disconnected from cam 171 and connected to cam 170 for hand operation, and may be disconnected from 170 and connected to cam 171 for automatic operation.

Throttle operating means

The throttle operating means is shown more particularly in Figs. 1, 7, 8 and 9. The details of the throttle operating mechanism 8 are shown in Figs. 8 and 9. The connection for operating the throttle is shown in perspective in Fig. 7. The throttle lever 57 has a slot 58 permitting an adjustable connection with the end of an adjustable link 59. The opposite end of the link 59 is connected to the operating lever 60 of the throttle operating unit 8. A series of apertures 61 are provided in the operating lever 60 to permit an adjustable connection with link 59. In this way the connection between the throttle lever 57 and the operating lever 60 may be properly adjusted.

Referring more particularly to Fig. 8, the lever 60 is operated by an electric motor 62 through the motor shaft 64, reduction gearing 65, shaft 66, to which the arm 60 is keyed. For stopping the motor there are three switches 67, 68 and 69 operated by the cams 67a, 68a and 69a keyed to shaft 66. In other words, the cams are rotated whenever the shaft 66 and arm 60 are rotated and operate the switches 67, 68 and 69 automatically to stop the motor at three different positions of the arm 60. With a Diesel engine one position is for a wide open throttle, an intermediate position is for idling and a third position for stopping the engine. With a gasoline engine one position is for a wide open throttle, an intermediate position is for idling the engine while connected or about to be connected to the propeller and the third position is a slower idling used for idling the engine when it is disconnected from the propeller.

In order to stop the electric motor promptly after the current is cut off, there is provided a brake 70 effective on the disc 71 keyed to the motor shaft. The brake is operated by means of an electric magnet 72 operatively connected thereto by a member 74, lever 75 pivoted at 76 and connected to the brake shoe 70 by a link 77. A suitable spring 78 retains the brake shoe in effective position normally but when current is applied to the motor, it is simultaneously applied to the electric magnet which releases the brake and permits the motor to operate the shaft 66 and arm 60.

A modified form of throttle operating mechanism is shown in Fig. 9 designed primarily to eliminate the necessity for the electrically operated brake. In this construction the shaft 66a is driven by the electric motor 62 through reduction gearing 65. The shaft 66a is connected to the cams 67a, 68a, 69a and arm 60a through a friction drive. For this purpose the cams 67a, 68a and 69a and arm 60a are keyed to a sleeve 79 which is free to rotate about the shaft 66a. A bushing 80 extends about the end of shaft 66a and is pressed against the arm 60a by means of a spring 81. A cup-shaped member 82 extends about the spring and is held in position by an adjustment nut 84. Thus when the shaft 66a is rotated, the arm 60a moves with it through the intermediation of the friction drive. When the arm moves sufficiently far to open the throttle, the motor may continue to operate by reason of the friction drive. Since the cams and the arm 60a are keyed to the same sleeve 79 they are always in the same position with respect to each other. Hence regardless of any movement of the throttle, manual or otherwise, the position of the cams with respect to the arms does not change. This modification is particularly adapted for manual operation of the throttle by a person in the engine room in making repairs and tests. The friction clutch permits the throttle to be operated manually without disturbing in any way its relation to the cams.

Pedestal

The pedestal is shown more particularly in Figs. 10 and 11 of the drawings, and in the wiring diagrams. Essentially the purpose of the pedestal is for closing the electrical contacts to operate the various controls. A casing 86 is provided having a stub-shaft 87. A disc 88 carries one set of contacts and is stationary with respect to the casing. An arm 89 carries another set of contacts and is rotatably mounted with respect to the casing and operatively connected by means of a pin 90 with the operating handle 91. The disc 88 is held in position by suitable screws and arm 89 is held in position by the nut 92 through the intermediation of a spring 93 pressing it against the disc 88. The handle 91 has at its lower end a disc-shaped portion having a central aperture fitting about the stub-shaft 87 and secured thereto by a nut 94. A suitable positioning cam 95 is rigidly secured to the handle 91 about the stub-shaft 87 to hold the handle in its three positions. The lower part of the cam has dwells 96 to accommodate a cam roller 97 pivotally mounted at 98 and held in its upper position by means of a spring 99 effective upon the member 100. Suitable switches 101 and 102 are mounted in the base of the pedestal for cutting out the clutch when it is desired to warm up the engine and also for shutting off the engine as described in more detail in connection with the wiring diagrams.

The arm 89 has a contact bridging member 104 at its upper end and a similar contact bridging member 105 at its lower end. The bridge member 104 operates the clutch controls and the member 105 operates the throttle controls. When the lever is in its upright position, the clutch is in neutral position and the throttle controls are closed for slowing the engine to idling speed. When the lever 91 is moved to the right, the cam 97 drops into the appropriate dwell and the clutch is thrown into ahead position. At this point the bar 105 is intermediate the throttle contacts and does not close them for operating the throttle control. Hence the engine continues at idling speed. If, however, the handle 91 is moved to the extreme right, the lower bar 105 will close contacts 106 which will operate the throttle control to speed up the engine. On the other hand if it is moved slightly to the left, contacts 107 will be closed which will slow down the engine if it is not already at idling speed. Hence by moving the handle 91 slightly to one side or to the other, the speed of the engine can be controlled without disturbing the position of the clutch. It will be noted that the contacts 108 are interconnected to prevent disturbance of the clutch during this slight movement for the control of the speed.

The movement of the handle 91 to the left operates in a similar manner to shift the clutch into astern position. Likewise the speed of the engine can be controlled while moving astern. The contacts 106 and 110 are for increasing the speed of the engine, and contacts 107 and 109 are for decreasing the speed of the engine.

In the operation of the above pedestal, it will be noted that two contacts are closed for throwing the clutch into ahead position, two contacts are closed for throwing it into neutral position, and two contacts are closed for throwing it into astern position making in all three pairs of contacts for the clutch control. It will also be noted that in the throttle control the closing of two contacts increases the speed of the engine by opening the throttle and the closing of another two contacts decreases the speed of the engine by closing the throttle. Thus, in all, five pairs of contacts control both the clutch operating mechanism and the throttle operating mechanism. As a somewhat less expensive device, there is shown in Fig. 18, a plate 155 having five push buttons therein. Push button 156 is adapted to control contacts for shifting the clutch into ahead position and corresponds to the closing of contacts 108 in Fig. 11. Push button 157 is adapted to control contacts corresponding to contacts 112 for shifting the clutch to neutral position. Push button 158 is adapted to control contacts corresponding to the contacts 111 in the pedestal for shifting the clutch into astern position. With each of the three push buttons 156, 157 and 158 it is necessary that they be held in downward position until the clutch is actually thrown and the cam operated switch controlling the circuit is automatically opened. If the push button is released prior to the complete operation of the clutch operating mechanism, the circuit will be opened before the cycle for throwing the clutch is completed.

Push button 159 may be utilized for closing contacts corresponding to the contacts 106 in the pedestal for operating the throttle control to open the throttle and speed up the engine. Likewise push button 160 may be utilized for closing contacts corresponding to the contacts 107 in the pedestal for slowing down the motor to idling speed. Thus the push buttons 159 and 160 may be utilized for controlling the speed of the engine and push buttons 156, 157 and 158 for controlling the clutch.

If desired the push buttons illustrated in Fig. 18 may be utilized instead of the pedestal in any of the circuits described herein. Separate switches corresponding to switches 101 and 102 of the pedestal may be located at any point adjoining the push buttons or elsewhere about the boat. It will be understood of course that while the push buttons are shown mounted in a single plate, they may be separately mounted if desired.

In certain instances, boats may be equipped with twin propellers and twin engines. In such cases it is desirable that each propeller and each engine be operated independently of the other. The present invention is applicable to such situations and there is illustrated in Fig. 19 a pedestal which is in effect the union of two pedestals such as shown in Figs. 10 and 11. The two levers 91a and 91b correspond to the lever 91 in the single pedestal of Figs. 10 and 11. The two switches 101a and 101b correspond either to the switches 101 or 102 of the single pedestal. By the use of such a pedestal, twin motors may be operated from the bridge at different speeds; likewise, the clutch for one propeller may be in ahead position and the other in astern position for turning the boat. The combined pedestals are usually preferable over two single pedestals where two engines are used.

*Wiring diagram for Diesel engine*

A wiring diagram for a boat engine is shown in Fig. 12. For convenience letters will be utilized for following the circuits. Letters $b$ and $c$ are the power lines or poles of a suitable battery. The contacts 108, 112 and 111 at the upper part of the pedestal are for the clutch operation and represent ahead, neutral and astern positions, respectively. For simplicity the circuits for these positions will be traced first without reference to the contacts 106, 107, 1' and 110 at the lower part of the pedestal which 'rate the throttle. Assuming that the pedestal a.m is in position to bridge the contacts 108 and thereby shift the clutch to ahead position, one side of the contacts will be connected through the wire $d$ and switch 101 to one side of the power line $b$. The other side of the contacts 108 will be connected through the wire $e$, switch 50, wire $e^1$, through the coil of relay 114, and wire $e^2$ to the other side $c$ of the power line. Relay 114 is then operated to close contacts 115. The closing of contacts 115 operates the coil of the clutch motor brake magnet 45 through wire $b^1$, the closing member 115c of the relay 114, wires $f$ and $f^1$, through the coil of the magnet 45 to one side of the motor armature and to the wire $c^1$, leading to the power line $c$. Thus the electric magnet is operated to release the brake on the motor 20. Fuse 113 is inserted in line $c^1$ for safety purposes. The operation of the relay 114 also connects the current to the motor circuit through wire $b^1$ to one side of the power line $b$ and from the other contact through wires $g$ and $g^1$ to the series field 116 through the armature of the motor 20 and wire $c^1$ to power line $c$. Thus the motor is operated to move the clutch into ahead position. The electrically operated brake 45 is released to permit the operation of the motor. The motor will continue to operate until the ahead cam switch 50 (Figs. 3 and 12) is opened, which occurs when the clutch is thrown slightly beyond the dead center position (Fig. 2) to relieve the pressure on the clutch resulting from the shifting operation.

Substantially the same operation occurs except through different switches and circuits when the operating handle 91 is moved to the astern position. In that case the inner row of contacts will be connected to one side $b$ of the power line through wire $d$ and switch 101, as in the case of the ahead and neutral shifts. The other side of the bridged contacts 111 connects with astern operating relay 117 through wire $h$, switch 51, wire $h^1$, relay 117, wire $h^2$, wire $e^2$ to the other side of the power line $c$. The operation of the relay 117 closes contacts 118. One side $b$ of the power line is connected through wire $b^1$, the operating member 118a of relay 117, and wires $f$ and $f^1$ to the brake releasing magnet 45. The other side of the magnet 45 is connected through wire $c^1$ to the other side of the power line. The operation of the relay 117, in closing the contacts 118, also operates the motor 20 by connecting one side $b$ of the power line through wire $b^1$, contacts 118, wire $b^3$ to the astern series field 119 and the armature of motor 20. The other side of the motor is connected to the power line $c$ through wire $c^1$. Since the coil of the field 119 is wound oppositely from that of field 116, the motor 20 will operate in reverse direction and shift the clutch to astern position.

When the arm 91 of the pedestal is shifted to neutral position to bridge contacts 112, one side is connected as before to the power line $b$ through switch 101 and wire $d$. The other side of the contacts 112 is connected through the wire $i$ to one or the other of neutral switches 53 and 54 depending upon which switch is closed. If the clutch is in astern position, the switch 53 will be closed and the switch 54 open. Hence current will be sent through switch 53 to switch 50 to shift the clutch toward ahead position. However, the switch 53, when the clutch reaches neutral position, will open and hence the clutch will not move forward to ahead position, but will stop at neutral. On the other hand if the clutch should be in ahead position, switch 54 will be closed and switch 53 open and current pass through the astern switch 51 and the clutch will be moved toward the astern position. But here again when the clutch reaches neutral position, switch 54 will be opened by reason of its cam 54a, in which event the clutch will stop at its neutral position. In neutral position switches 53 and 54 are both open. If by any chance the clutch should move past the neutral position, if toward astern, switch 53 will close, which immediately passes current to switch 50 to move the clutch back toward ahead position until it reaches neutral. Conversely if the clutch passes the neutral point toward the ahead position, then switch 54 sends current through astern switch 51 which moves it toward astern position until it reaches neutral again. Hence the switches 53 and 54 automatically move the clutch to neutral position regardless of the position that it was in before. In addition, if the clutch through momentum, drifts or otherwise moves past its neutral position, it is automatically returned to neutral position, and is stopped in its proper neutral position. In this manner the neutral position of the clutch may be maintained accurately by adjusting the cams 53a and 54a which control switches 53 and 54.

As pointed out above when the clutch is thrown into ahead position or astern position, it may be desirable either to speed up the engine or to slow it down. This can be achieved by moving the pedestal arm 91 without interfering with the clutch operation. For convenience, the movement of the arm to the right when in ahead position speeds up the engine and the movement of the arm to the left slows it down. Contacts 106 are for increasing the speed of the engine and contacts 107 are for slowing the engine down. The same results are achieved when the engine is in astern position by moving the handle to the left to speed it up and to the right for slowing it down. When the handle is in neutral position the contacts for slowing the engine down are closed.

Tracing the connections now for the operation of the throttle and beginning at contacts 106 for speeding up the engine, it will be noted that one side of the contacts is connected through wire $b^4$ and switch 102 to one side $b$ of the power line, when the switch 102 is in its upper position as shown. The other side of the contacts 106 is connected through wire $j$ to interlock switch 52. The interlock switch 52 has three switch closing cam surfaces corresponding to ahead, astern and neutral. If the interlock switch 52 is in its lower position, that is, if the clutch is either astern or ahead, the current will follow through wires $j^1$ and $j^3$ to fast operating relay 120 and through the relay 120, wire $j^3$, switch 67, wire $j^4$ and fuse 121 to the other side $c$ of the power line. Thus the relay 120 will maintain contacts 124 so long as the switch 67 and the switch 52 remain closed. The switch 67 will open automatically when the throttle reaches its wide open position by reason of the cam 67a which controls it.

The closing of the relay 120 and the contacts 124 thereof operate the electric magnet 72, releasing the brake on the motor 62 through wire $b^6$ leading from the power line $b$ to the center of the inner contact points of the relays and thence through the operating arm of the relay 120, wires $k$ and $k^1$ through the coil of the magnet 72. The opposite side of the coil of the magnet 72 is connected through wire $c^5$ and fuse 121 to the power line $c$. The closing of the contacts 124 of fast operating relay 120 also closes the circuit through the motor 62. One contact connects through wire $b^6$ to power line $b$. The other contact is connected through wire $r$, the field and armature of the motor 62, wire $c^5$ to the power line $c$. The motor operates to open the throttle and increase the speed of the engine.

If the clutch is in the process of being moved from one position to another, that is being thrown out or in, the switch 52 will be up in the position shown in Fig. 12. In that case if the handle 91 is thrown to increase the speed of the motor, current will flow not through the wire $j^1$ from switch 52, but through wires $t^1$ and $t^2$ through relay 126, wire $t^3$ through switch 68, wires $j^4$ and $c^5$ to the other side $c$ of the power line. Thus instead of speeding the motor up it actually connects through the relay to slow the engine down. Thus the speed of the engine is automatically reduced to a safe operating speed for throwing the clutch. After the clutch is thrown, the engine speed will be increased by the automatic opening of relay 126 and the automatic closing of relay 120 if the pedestal handle 91 is retained in fast position. The operation of the relay takes place after the clutch is thrown and closes the contacts 127, which releases the brake 72 through wire $b^6$ leading from the power line $b$, the operating arm of the relay 126, wire $k$ and $k^1$ to the wire $c^5$ which leads to the other side $c$ of the power line. The closing of the contacts 127 of the relay 126 also connects the motor 62 to close the throttle and reduce the engine to idling speed. The motor circuit closes through power line $b^6$ leading from power line $b$ through contacts 127, wire $m$, and the series field of the motor 62, the other side of the motor being connected through wire $c^5$ to the power line $c$. Thus if the arm 91 is operated to speed up the engine the throttle will be opened if the clutch is either in astern, neutral or ahead position. If it is in the process of being moved to either of these positions or from either of these positions, the control is automatically connected through the mechanism for closing of the throttle, and the engine will be slowed down. The reason for this is that the clutch should not be operated with the throttle open or with the engine at an excessive speed.

If the arm 91 is operated to reduce the speed of the engine, the upper contacts for the throttle control are connected through switch 102 and directly to one side of the power line $b$. The other side of the throttle contacts 107 or 109, as the case may be, is connected through wire $n$ to wire $t^2$ which leads to the relay 126 and operates the same. The operation of the relay operates the motor 62 to move the throttle toward idling position, thus slowing down the engine as described previously with reference to the operation of this relay through interlock switch 52 with the latter in its upper position as shown in Fig. 12.

The switch 101 is for purposes of throwing the clutch into neutral position while the engine is being warmed up and to prevent the operation of the clutch during this period. When the switch is moved from its upper position as shown in Fig. 12 to its lower position, the circuit through wire $d$ is broken and at the same time the power line $b$ is connected directly to the wire $i$, which in effect short-circuits contacts 112 and has the same effect as locking the arm 91 in neutral position.

The switch 102 is particularly useful in connection with the operation of Diesel engines. The heavy Diesel engines do not have an ignition system. The engine can be stopped only by cutting off entirely the supply of oil. Gasoline engines can be stopped at any time by opening the ignition circuit. It is not customary to reduce the throttle in a gasoline engine below the idling speed; with a Diesel engine it is. When the switch 102 is changed from its upper position as shown in Fig. 12 to its lower position, the power line $b$ is connected by wire $\,^?$ to the line $n$ which leads to the line $t^2$. Wire $t^2$ leads to the upper end of the relay 126 and operates the relay through the idling switch 68 as described above until the switch 68 opens under the influence of the operating cam 68a. The other side of the switch 102 connects at its upper pole through wire $o^3$ to the lower side of the relay 126 and thence through line $t^3$ through switch 68, wires $j^4$ and $c^5$ to the power line $c$. The other side of switch 102 at its lower contact is connected through wire $o^1$, wire $o^2$ to switch 69 and wires $j^4$ and $c^5$ leading to one side $c$ of the power line. The middle contact of the switch 102 is connected through line $o^3$ to the line $t^3$ to switch 68. The operation of the switch 102 to its downward position in effect connects the switches 68 and 69 in parallel from the lower side of the relay coil 126 to the wire $j^4$ which leads to wire $c^5$ and to one side of the power line $c$. The result is that the relay 126 for closing the throttle is held closed until both the switches 68 and 69 open. The switch 68 opens when the engine reaches the idling speed, but the cam for the switch 69 is set so that it does not open until the throttle is completely closed and in this way the Diesel engine is stopped. In a gas engine, the two cams 68 and 69 and switch 102 may be utilized for giving an idling speed at which the clutch may be shifted ahead or astern without stopping the engine and a still lower idling speed when the clutch is completely disconnected from the propeller.

The resistances 190 and condensers 191 are to minimize the flash at the opening and closing of the circuits in which they are connected. The resistances 192 and condensers 194 serve the same purpose on the throttle control side.

While the automatic unit and the automatic throttle unit are shown herein for conjoint use, it will be understood that either may be used separately from the other as well as in combination with it. While the best results are obtained by using the two together, in certain instances it might be desirable to use one alone. There is no intention of restricting the scope of the invention to their combined use as each is claimed separately in the claims, in addition to the two being claimed in combination.

*Wiring diagram for fully automatic operation*

In Fig. 13 a wiring diagram for a fully automatic mechanism is shown wherein the arm 91 (Figs. 10 and 11) of the pedestal may be moved from full speed ahead to full speed astern and the engine will be slowed down automatically to clutch throwing speed or to idling speed before the clutch will be thrown. This is important in connection with heavier engines because if the engine is disconnected from the propeller, the load is released from the engine and the engine races. The racing may be sufficient to throw a piston rod through a cylinder head or to do some other damage to the engine. The complete wiring diagram has been shown although, in effect, it is in substance the same as the wiring diagram shown in Fig. 12 with certain additions for achieving the objects desired. In connection with the relays 117 and 114 in Fig. 12, their lower ends are connected to one side $c$ of the power lines through the wire $e^2$. In the present wiring diagram, the lower ends of the relays 114 and 117 are connected to the wire $c$ through wires $e^5$, interlock switch 62b, wires $j^4$, $c^5$ back to the power line $c$. Thus the relays for throwing the clutch to astern or ahead position can only be operated when the switch 68b is in its lower position. The switch 68b is in its lower position only when the throttle is in idling position. Hence the clutch operating relays 114 and 117 are prevented from operating and, therefore, the clutch is automatically prevented from being operated to either ahead or astern positions except when the engine is idling.

When power is applied to the relays 114 or 117, as described in connection with the wiring diagram in Fig. 12, for moving the clutch either ahead by closing contacts 108 or astern by closing contacts 111, the relays 129 and 130 (Fig. 13) are operated. The relay 130 is operated when the pedestal contacts 111 are closed to energize astern relay 117, and the relay 129 is operated when the pedestal contacts 108 are closed to energize ahead relay 114 since the lower ends of the relays 129 and 130 are connected directly to the power line $c$. The energizing of relay 129 opens contacts 131 and closes contacts 132. The energizing of relay 130 opens contacts 134 and closes contacts 135. The opening of either the contacts 131 or 134, that is, the energizing of either of the relays 129 or 130, opens the line $j^1$ leading from the clutch interlock switch 52 to the fast throttle relay 120 for opening the throttle. Hence with interlock switch in its lower position, that is, with the cam 52a for operating switch 52 indicating that it is in either neutral, astern or ahead position, the relay 126 for opening the throttle and speeding up the motor cannot be operated. On the other hand, the closing of either the contacts 132 or 135, that is, the operation of either the relay 129 or 130 connects the power line b with line t² leading directly to relay 126 which is the relay for closing the throttle to idling speed. However, the line t³ leads through switch 68b of the throttle and if the throttle is in any position excepting idling position, it will be slowed to idling position.

*Automatic control for temperatures or oil pressures*

In Fig. 14 there is shown an automatic device for shutting the engine off when either the pressure in the oil line is too low or the temperature of the engine is too high. This mechanism can be applied to any of the wiring diagrams described herein and is shown in Fig. 14 applied to the wires leading to the pedestal. There is shown a device 136 in the form of a bellows which is responsive to the pressure in the oil line and a device 123 in the form of a thermostat responsive to the temperature of the engine. In the preferred embodiment the bellows is shown in expanded position, which is the condition when the oil pressure is normal. When the oil pressure is subnormal, the bellows 136 will contract and open the contacts 137. The opening of the contacts 137 de-energizes the relay 138 which opens contacts 140 and closes contacts 141 and 142. It will be noted that with the contacts 140 closed and the contacts 141 and 142 open, the relay and the bellows have no effect on the line whatsoever. That is the normal operating condition. If the oil pressure becomes too low, the contacts 137 will open. Thereupon contacts 141 and 142 close, which have identically the same effect as throwing the switch 102 down, the function of which is to stop the engine. In other words opening the contacts performs automatically the function of shutting off the engine by closing the throttle. At the same time the contacts 140 are opened, which opens the line j¹ and prevents the fast contacts from being closed at the pedestal, which would tend to open the throttle.

A similar mechanism may be utilized for shutting the engine down when the temperature of the engine is too high. In that case when the temperature is too high, the contacts 143 would be opened and when the temperature was normal or less than normal the contacts 143 would be closed as shown in Fig. 14. The relay 133 closes the contacts 143 which are in series with contacts 137. The latter contacts 143 are operatively connected to a temperature responsive device 123 which may be located at any suitable part of the engine. There is an advantage in having the circuit of the relay 138 closed because in the event of the failure of the current source 139, the engine automatically stops. Of course, the oil pressure is always too low when the engine is about to start and hence a suitable push button 144 is provided for closing the switch across the contacts 137 when the engine is about to be started.

In the operation of a gasoline motor, the simplest way of stopping it is to shut off the ignition. In Fig. 15 a device is shown similar to that in Fig. 14 except that the control circuit is the ignition circuit. When the pressure in the oil line is too low, the contacts 137a are open and when the temperature is too high, contacts 143a are opened. In either case the ignition is shut off. In this figure also a push button 144a is utilized for closing the circuit, when the engine is being started.

*Pedestal wiring diagram for gasoline engine*

In Fig. 16, there is shown a wiring diagram of a pedestal which is particularly adapted to gasoline engines. In this diagram there is a single switch 145 of the double-pole, double-throw type which, when thrown upwardly, is in normal operating position. When thrown downwardly the right side of the switch, in effect, closes contacts 112 which is the same as having the operating arm 91 of the pedestal (Figs. 10 and 11) locked in its neutral position. The left side of the switch 145 is identical with the left side of switch 102 shown in Fig. 12. The purpose of closing the lines o¹ and o³ is to slow the speed of the engine to its lowest idling speed, that is, the idling speed desired when the clutch is disconnected from the propeller and, hence, with no load on the engine. The circuit for wires o¹ and o³ may be traced in Fig. 12 of the drawings, the cam 69a for controlling the switch 69 is set to give lower throttle setting than given by cam 68a.

*Wiring diagram for two pedestals*

There is shown in Fig. 17 a wiring diagram for a plurality of pedestals, here shown as two. The two pedestals are identical in every respect and correspond to the pedestal shown in Figs. 10 and 11. It frequently happens that a person will desire to operate a boat from the stern and at other times from the bridge. In fact in larger boats one may desire to operate it from several positions. For interconnecting the wires of the pedestals there is provided a pair of switch mechanisms 146 and 147, each having four groups 153 of contacts with three contacts in each group. The outer contacts of each group are connected one to each of the pedestals and the middle contact of each group is connected through the rotary switching elements to the outgoing wire for the control mechanism. The desired operation is to connect the eight wires of one pedestal to the eight outgoing wires to the control mechanism, and at the same time disconnect the eight wires of the other pedestal. Four suitable bridging connectors 148 in each switching mechanism are provided which connect the middle connector of each group, which is the outgoing wire, to either of the two pedestals. If the switching mechanism 146 is rotated to the right so that the bridging connectors 148 engage the two contacts at the right of each of the groups 153 of the contacts, the right pedestal is connected. If rotated to the left so that the left two contacts of each of the groups 153 of the contacts are bridged, the left pedestal is connected to the controls. In this way either pedestal may be connected to the outgoing wires. A shaft 149 connects the members and has on its end a knob 150 by which it may be rotated. By means of this shaft and the arms, carrying the bridging connectors mounted thereon, either pedestal may be selected for maneuvering the boat.

*Operation*

The operation of the various parts and the circuits for the electrical devices have been described in detail above and an elaborate explanation here would be repetitious. Assuming that the pedestal handle 91 (Figs. 10 and 11) is in its vertical position, the clutch will be in neutral and the engine will be idling. If the handle 91 is now moved over to its ahead position, it will bridge contacts 108 (Fig. 12). One side of the contacts 108 is connected to the power line $b$ through wire $d$ and switch 101. The other side of the contact 108 is connected to the upper end of the ahead operating relay 114 through wire $e$, cam operated switch 50 and wire $e^1$. The lower end of the relay 114 is connected to the power line $c$, through wire $c^2$. The operation of the relay 114 closes the power circuit through the brake solenoid 45 by means of the wire $b^1$, member 115a, wires $f^1$, $c^1$ and $e^2$. The relay 114 closes the power circuit through motor 20 and its ahead field 116 through wires $b^1$, relay contacts 115, wires $g$, $g^1$, ahead field 116, motor 20, wires $c^1$ and $e^2$. Thus the motor 20 is operated to shift the clutch into ahead position through toggle links 10, 11 and 12 (Fig. 2). The load on the motor is maintained as uniform as possible by reason of the fact that the toggle joint closes the clutch at the time of its greatest leverage, that is, when it is reaching its straight position. The movement continues until the toggle is past dead center position so that the pressure on the clutch is released slightly to prevent "riding."

If at this point it is desired to speed the engine up, the handle 91 is moved to the right, which will close throttle operating contacts 106. One side of the contacts is connected to power line $b$, through switch 102 and wire $b^4$. The other side of the contacts 106 is connected through wire $j$, to interlock switch 52, which will be in its lower position since the clutch is in ahead position. From the switch 52 the wires $j^1$ and $j^2$ connect with the lower end of fast operating throttle relay 120, the upper end being connected to the power line $c$ by wires $j^3$, fast switch 67, wires $j^4$ and $c^5$. Thus the speed of the engine will be increased as much as desired up to maximum speed. Whenever the arm 91 is drawn back to its middle position, either ahead or astern, the relay 120 opens and the throttle remains in adjusted position. After the speed of the engine has been increased, it can be decreased toward idling speed by moving the lever 91 slightly to the left to close throttle operating contacts 107. One side of the contacts 107 will be connected to the power line $b$ through wire $b^4$ and switch 102. The other side will be connected through wires $n$ and $t^2$ to the upper end of slow throttle operating relay 126. The other end of the relay 126 is connected through wire $t^3$ to idling switch 68, wires $j^4$ and $c^5$ to power line $c$. Thus the speed of the engine will be decreased until the idling switch 68 operates when the idling speed of the engine is reached. The operation of relays 120 and 126 to close the brake circuit and also the motor circuit through the cam operated switches to open and close the engine throttle is described in detail in connection with the wiring diagram of Fig. 12.

If the lever 91 is switched to its vertical position, either from astern or ahead, the contacts 112 (Fig. 12) will be closed for shifting the clutch to neutral position. The lower side of the contact 112 is connected to power line $b$ through wire $d$ and switch 101. The upper contact is connected through wire $i$ to neutral switches 53 and 54. If the clutch was formerly in ahead position, the neutral switch 54 and astern switch 51 will be in closed position and will be connected and if it was in astern position before, neutral switch 53 and ahead switch 50 will be in closed position and will be connected. Wire $e^1$ connects to the ahead relay 114 and wire $h^1$ connects to the astern relay. Thus the clutch will be moved to neutral, in which position both switches 53 and 54 will open, thereby stopping the motor 20 which operates the clutch. If it should move past neutral in either direction, one of the neutral switches will close, thereby moving it back again. Thus by adjustment of the cams for the two neutral switches, the neutral position may be accurately maintained.

If the lever 91 is moved from fast speed ahead through to fast speed astern, the slow speed circuits 107 and 109 will be closed, which tend to bring the speed down to proper clutch operating speed. In addition, if the clutch is being shifted from one position to another, the interlocking switch 52 will be in its upper position and instead of the fast operating contacts 106 or 110 connecting with $j^1$ through the interlocking switch, they will connect through wire $t^1$ which leads directly to the slow operating relay 126. This slow operating relay will operate the motor 62 to close the throttle until the clutch has been shifted to ahead or astern position when the interlock cam will move interlock switch 52 from the wire $t^1$ to $j^1$ and speed up the engine.

With certain types of engines it is desired that the engine be reduced to idling speed before the clutch is shifted. For this purpose in Fig. 13 there is shown the additional relays 129 and 130 which are connected in the circuits so that if the lever 91 is shifted full speed ahead to full speed astern, or vice versa, relays 129 and 130 automatically make connections for operating the throttle for reducing the throttle to idling speed before the clutch may be thrown. The mechanism shown in Fig. 12 will reduce the speed to some extent and sufficiently low for proper operation of the clutch with most types of engines. The construction illustrated in Fig. 13 will reduce the engine to idling speed before the clutch may be thrown.

In some cases it may be desired to operate the clutch or the throttle from the engine room without using the pedestal. The mechanism shown in Figs. 20 and 21 provides a hand lever 176 which automatically throws out the automatic clutch control permitting hand operation of the clutch. The friction drive for the throttle operating mechanism shown in Fig. 9 permits the throttle to be operated manually without disturbing its power operating connection.

It will be seen that the present invention provides automatic means for maneuvering a boat from the bridge or other positions remote from the engine with the same ease and effectiveness as can be done at the engine. The delays incident to the communication of orders from the pilot at the bridge to the operator at the engine are eliminated. A pilot, even in the larger boats, may maneuver the boat without an engine assistant and with greater effectiveness than he could formerly with an engine assistant. The various automatic devices are simple in construction and effective in operation. Automatic mechanism is provided for shifting the clutch to an accurate neutral position to prevent engagement with either the astern or ahead gear. The automatic mechanism for controlling the speed of the engine is combined with the clutch controls and automatic devices to prevent the shifting of the clutch until the engine is operating at a safe speed therefor. Effective means are provided for stopping and locking the clutch and the throttle in their desired positions. The invention is applicable to both small and large engines, to both gasoline and Diesel engines, and to boats with one or more engines. The various mechanisms and parts may be subjected to the severe conditions encountered in marine operation without impairment of their effectiveness or materially shortening the period of their usefulness. The operations may be made with a minimum power requirement without substantial strain on the parts.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. In a control for motor boats and the like, the combination of power operated means for throwing a clutch, devices for causing the operation of said power operated means, an electric motor for changing the position of the engine throttle and mechanism responsive to said devices for operating said electric motor to change the position of the engine throttle to various positions intermediate maximum and throttling speeds.

2. In a control for motor boats and the like, the combination of electrically operated means for throwing a clutch, a plurality of devices at different positions on a boat for causing the operation of said electrically operated means, an electric motor for moving the engine throttle to any desired position from open to idling position and mechanism responsive to said devices for operating said electric motor to change the position of the engine throttle.

3. In a control for motor boats and the like, the combination of power operated means for throwing a clutch, a plurality of devices at different positions on a boat for causing the operation of said power operated means, means for rendering one only of said devices effective at any one time, and mechanism responsive to said devices for operating the engine throttle.

4. In a control for motor boats and the like, the combination of electrically operated means for throwing a clutch, devices for causing the operation of said electrically operated means, an electric motor for operating the engine throttle and mechanism responsive to said devices for operating said electric motor to change the position of the engine throttle to any desired extent from open to closed throttle position, movement of a part of said devices in one direction being adapted to operate said mechanism to speed up the engine and operation of said part in the other direction being adapted to slow down the speed of the engine.

5. In a control for motor boats and the like, the combination of power operated means for throwing a clutch, devices for causing the operation of said power operated means, including a lever, for operating said power operated means to throw the clutch into three positions, and a second power operated means for operating the engine throttle, said lever being adapted to start and stop said second power operating means for adjusting the throttle without disturbing the position of the clutch.

6. In a control for motor boats and the like, the combination of power operated means for throwing a clutch, devices for causing the operation of said power operated means to throw said clutch into three positions, ahead, neutral and astern, an electric motor for changing the position of the engine throttle, means responsive to said devices for automatically operating said motor when said clutch is in neutral position to slow down the engine to idling speed.

7. In a control for motor boats and the like, the combination of power operated means for throwing a clutch, devices for causing the operation of said power operated means, an electric motor for operating the engine throttle, and mechanism responsive to said devices for controlling the operation of said motor, a movement of a part of said devices in one direction being adapted to operate said motor to open the throttle to speed up the engine and movement in the other direction being adapted to partially close the throttle to slow the engine down, said mechanism being adapted automatically to operate said motor to partially close the throttle when the clutch is moved to neutral position.

8. In a device of the class described, the combination of power operated means for throwing a clutch into neutral, ahead and astern, devices for causing the operation of said power operated means to operate said clutch, and mechanism responsive to said devices, including an electric motor and electrical relays effective upon said motor, for operating the throttle to control the speed of the engine, said mechanism being adapted automatically to operate said throttle to slow down the engine before said clutch is thrown into neutral position.

9. In a device of the class described, the combination of power operated means, including an electric motor and electrical relays effective thereupon, for throwing a clutch into neutral, ahead and astern, devices for causing the operation of said power operated means to operate said clutch, and automatic means including limit switches for preventing said power operated means from throwing the clutch until the speed of the engine has reached a safe operating speed therefor.

10. In a device of the class described, the combination of power operated means for throwing a clutch into neutral, ahead and astern, devices for causing the operation of said power operated means to operate said clutch, means including cams and limit switches for preventing the supplying of power to said power operated means for throwing the clutch until the speed of the engine has reached a safe operating speed therefor.

11. In a control for motor boats and the like, the combination of power operated means for throwing a clutch, devices for causing the operation of said power operated means, mechanism responsive to said devices for operating the engine throttle, and automatic means including cams and limit switches for preventing operation of the throttle to speed up the engine until the clutch is in proper position.

12. In a device of the class described, the combination of a lever for operating a throttle, power driven means for operating said lever, a plurality of cams fixedly connected with said lever for stopping said power driven means at predetermined positions of said lever, and friction means for operatively connecting said power driven means to said lever.

13. In a device of the class described, the combination of a lever for operating a throttle, power driven means for operating said lever, a plurality of cams fixedly connected with said lever and friction means for operatively connecting said power driven means to said lever, and limit switches operatively connected to said cams for stopping said power driven means.

14. In a device of the class described, the combination of an electric motor, means for operatively connecting said motor to operate a throttle, a plurality of cams operatively connected to the throttle and means responsive to the position of the cams for stopping the motor at a plurality of different throttle positions.

15. In a device of the class described, the combination of an electric motor, means for operatively connecting said motor to operate a throttle, a plurality of cams operatively connected to the throttle, means responsive to the position of the cams for stopping the electric motor at three predetermined positions, a brake for preventing the motor from drifting, and means for automatically applying the brake when current is cut off from the motor.

16. In a device of the class described, the combination of an electric motor, means for operatively connecting said motor to operate a throttle, a plurality of cams operatively connected to the throttle, means responsive to the position of the cams for stopping the electric motor at a plurality of different throttle positions, a brake for preventing the motor from drifting, and magnetic means for releasing the brake when current is applied to the motor and for permitting said brake to be applied to stop the motor when current is cut off from the motor.

17. In a device of the class described, in combination, power operated means for throwing a clutch, means for controlling said power operated means having three positions, one for neutral, one for astern, and one for ahead, devices for resiliently retaining said means in any one of said three positions, electric devices adapted to be closed when said means is moved slightly out of its ahead or astern position to speed up and slow down the engine without throwing the clutch.

18. In a device of the class described, the combination of electrically operated means for throwing the clutch, electric contacts for operating said electrically operated means to throw said clutch into neutral, astern and ahead positions, means for closing said contacts, devices for resiliently retaining said means in any one of said three positions, means including electrical contacts for controlling the speed of the engine, and means on said lever for operating said contacts while the clutch is in ahead or astern position.

19. In a control for motor boats and the like, in combination, power operated means for throwing a clutch into neutral position, and automatic devices effective upon said power operated means for returning the clutch to neutral position if said power operated means moves the clutch past its neutral position.

20. In a control for motor boats and the like, in combination, power operated means for throwing a clutch into neutral position, and means including limit switches for moving the clutch to neutral position if it stops a predetermined distance on either side of its true neutral position thereby accurately to hold the clutch in neutral position.

21. In a device of the class described, the combination of power operated means for shifting a clutch, a lever for shifting said clutch by hand, and a cam operatively connected to said lever for automatically disconnecting said power operated means from the clutch by the manual operation of said lever for shifting the clutch.

22. In a control for motor boats and the like, the combination of a power operated means for throwing a clutch, a pair of pedestals at different positions on a boat each having a lever thereon for causing the operation of said power operated means, means for rendering only one of said pedestals effective at any one time and mechanism responsive to said levers for operating the engine throttle.

23. In a device of the class described, the combination of an electric motor for throwing a clutch into neutral, ahead and astern positions, devices for causing the operation of said electric motor to operate said clutch, means including cams and limit switches for preventing the supplying of power to said electric motor for throwing the clutch until the speed of the engine has reached a safe operating speed therefor.

24. In a control for motor boats and the like, the combination of an electric motor for throwing a clutch, devices for causing the operation of said electric motor, mechanism responsive to said devices for operating the engine throttle and means including cams and limit switches for preventing the operation of the throttle to speed up the engine until the clutch is in proper position.

25. In a device of the class described, the combination of a motor for shifting a clutch, devices for operatively connecting said motor to the clutch, including a member fixed on the shaft of the motor, a second member movably mounted with respect to said fixed member for operating the clutch, a spring depressed member for operatively connecting said first two members, a cam rotatably mounted on said first member and a lever operatively connected to said cam, said cam being adapted to raise said spring depressed member to disconnect the motor from the clutch and being adapted also to interlock with said spring depressed member to connect said lever with the clutch.

26. In a control station having a controller for electrical operation of a clutch between disengaged and engaged positions and for concurrently controlling the throttle of an engine coupled with the clutch; electric circuit control means operated by the controller to disengage the clutch upon adjustment of the throttle to a predetermined low speed setting; and circuit control means alternately cooperating with said controller to engage the clutch upon predetermined movement of the controller in throttle advancing direction, said latter circuit control means remaining operative to engage the clutch regardless of the extent to which the throttle setting is advanced.

27. In an engine control, a throttle for the engine; a reverse gear operating mechanism having an electric motor for shifting the clutch to forward or reverse position and back to neutral position and including means for rendering the motor temporarily inoperative when the clutch is engaged in either forward or reverse positions; a manually operable controller movable forwardly and backwardly from idling position for opening the throttle more or less depending upon the extent of movement thereof from said idling position; and circuits for controlling said motor including switches operated by said throttle controller severally causing the motor to move the clutch to neutral, forward and reverse positions, said switches controlling the forward and reverse positioning of the clutch remaining closed over the entire range of movement of the controller in forward and reverse positions respectively whereby the motor will automatically operate to restore the clutch to the condition called for by the position of the controller should the clutch become dislodged from that condition.

OLIVER L. ALLEN.
EARLE F. ALLEN.

REFERENCES CITED

The following references are of record in the file of this patent:

UNITED STATES PATENTS

| Number | Name | Date |
|---|---|---|
| Re. 20,482 | Lange | Aug. 24, 1937 |
| 944,497 | Pearson et al. | Dec. 28, 1909 |
| 1,501,600 | Hartford | July 15, 1924 |
| 1,657,098 | Hamersveld | Jan. 24, 1928 |
| 1,682,358 | Sperry | Aug. 28, 1929 |
| 1,686,760 | Myers | Oct. 9, 1929 |
| 1,751,647 | Nieman | Mar. 25, 1930 |
| 1,754,740 | Clarkson | Apr. 15, 1930 |
| 1,801,366 | Peterson | Apr. 21, 1931 |
| 1,819,452 | Wright | Aug. 18, 1931 |
| 1,915,822 | Green | June 27, 1933 |
| 1,940,845 | Conner et al. | Dec. 26, 1933 |
| 1,944,326 | Hudson | Jan. 23, 1934 |
| 1,985,394 | Anderson | Dec. 25, 1934 |
| 1,993,983 | Woodward | Mar. 12, 1935 |
| 1,997,444 | Wilson | Apr. 9, 1935 |
| 2,010,960 | Pogue | Aug. 13, 1935 |
| 2,011,651 | Puffer | Aug. 20, 1935 |
| 2,051,553 | Fleischel | Aug. 18, 1936 |
| 2,055,505 | Sanford | Sept. 29, 1936 |
| 2,073,774 | Atteslander | Mar. 16, 1937 |
| 2,102,598 | McDill | Dec. 21, 1937 |
| 2,113,860 | Sanford et al. | Apr. 12, 1938 |
| 2,147,694 | Fawick | Feb. 21, 1939 |
| 2,163,021 | Bush | June 20, 1939 |
| 2,167,951 | Janicke | Aug. 1, 1939 |
| 2,201,118 | Beede | May 14, 1940 |
| 2,206,771 | Dugas | July 2, 1940 |
| 2,234,019 | Bragg | Mar. 4, 1941 |
| 2,238,133 | Sanford | Apr. 15, 1941 |
| 2,238,574 | Thomas et al. | Apr. 15, 1941 |
| 2,248,564 | Wood | July 8, 1941 |
| 2,250,882 | Williamson | July 29, 1941 |
| 2,266,598 | Hale | Dec. 16, 1941 |